FIG. I

Jan. 3, 1967 V. F. SEITZINGER 3,296,060
UNFIRED-CERAMIC FLAME-RESISTANT INSULATION AND
METHOD OF MAKING THE SAME
Filed Oct. 18, 1963 4 Sheets-Sheet 2

INVENTOR.
VAUGHN F. SEITZINGER
BY
ATTORNEYS

Jan. 3, 1967  V. F. SEITZINGER  3,296,060
UNFIRED-CERAMIC FLAME-RESISTANT INSULATION AND
METHOD OF MAKING THE SAME
Filed Oct. 18, 1963  4 Sheets-Sheet 3
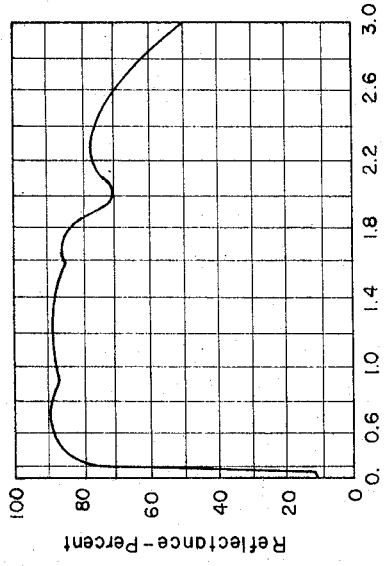
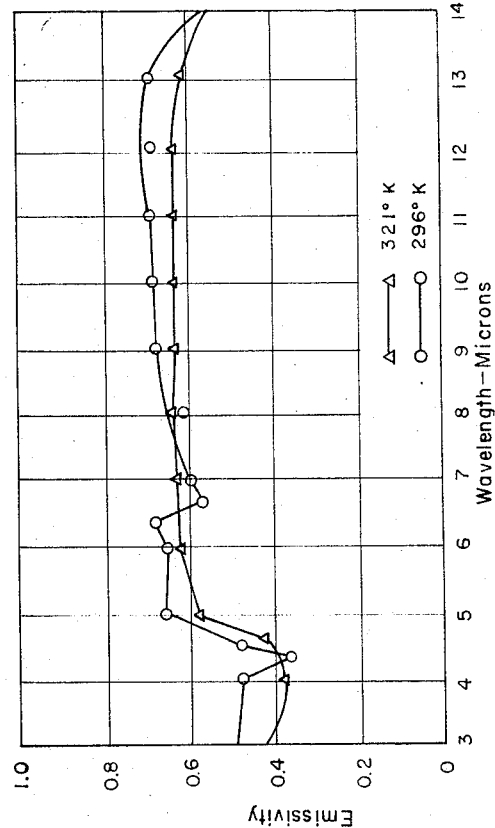
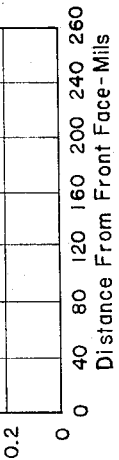
INVENTOR.
VAUGHN F. SEITZINGER
BY
ATTORNEYS United States Patent Office 3,296,060
Patented Jan. 3, 1967

3,296,060
UNFIRED-CERAMIC FLAME-RESISTANT INSULATION AND METHOD OF MAKING THE SAME
Vaughn F. Seitzinger, Fayetteville, Tenn., assignor to the United States of America as represented by the Administrator of the National Aeronautics and Space Administration
Filed Oct. 18, 1963, Ser. No. 317,389
22 Claims. (Cl. 161—115)

The invention described herein may be manufactured and used by or for the Government of the United States of America for governmental purposes without the payment of any royalties thereon or therefor.

This invention relates to an insulating material and the method of producing the same and is concerned particularly with the provision of a highly reflective composite insulating composition having flame-resistant properties superior to the corresponding properties of heretofore known flame-resistant material. The invention further contemplates articles of manufacture comprising a base structure having thereon a coating of a new highly reflective, flame-resistant insulating material.

Various types of both organic and inorganic flame-resistant insulating materials have long been used to reduce the inflammability of articles composed either wholly or in part of combustible organic substances. Although these insulating materials are adequate for most uses the recent dawning of the space age and the accompanying development of extremely large launch vehicles, which generate tremendous quantities of heat during their burning period, has created numerous new insulating problems that were heretofore unknown or of little concern. For example, the development of the Saturn Class launch vehicle presents in and of itself many major insulating problems, not the least of which is protecting the base of the vehicle from the thermal environment to which it is exposed during the ignition, lift-off and flight stages of a launch. Although base heating has been known to occur to a somewhat limited extent in previously developed small size rocket and launch vehicles, it is readily realized that since the Saturn I utilizes a cluster of eight 188,000-pound thrust engines which combine to create a total thermal load in the ordered 3,600 B.t.u./ft.$^2$, the degree of heating experienced in the Saturn Class vehicle is considerably more severe than anything heretofore encountered.

Although a significant amount of research has been devoted over the past several years toward the development of insulating material capable of performing satisfactorily under the severe conditions encountered when used with a rocket motor, the majority of this work has been directed toward those insulating materials applicable to primarily convective heating environments. This is understandable when it is realized that until recently it was thought that the largest portion of the heat load applied to a launch vehicle or missile was caused by convective heating. The recent conclusion of rather extensive tests into the cause of heating in launch vehicles has revealed, however, that the majority of the heat load in the base area is induced through radiation from the engine plumes and therefore only a relatively small amount is induced by convection from recirculating exhaust gases. In fact, approximately 50 to 90 percent of the total heat load applied to the base plate of a Saturn Class launch vehicle, depending on which portion of the launch trajectory the rocket is in, is produced by radiation heating with the remainder being contributed by convective heating.

The insulative materials heretofore relied upon to insulate launch vehicles have been heavy, highly inflammable compositions of material that generally contain an epoxy-phenolic resin, asbestos filler, and an alcohol vehicle. In addition to possessing these inherent undesirable characteristics the problem of applying these prior known insulative materials to the portion of the launch vehicle to be protected has presented substantial fabrication problems. This is particularly true in those cases where the structure to be insulated was either irregularly shaped, extremely bulky, or hard to reach. The difficulties encountered in applying the insulative material in these instances is readily apparent when it is realized that the approved method of coating these surfaces calls for a plurality of dipping and/or spraying operations followed by a long curing cycle at elevated temperatures. Not only were many of the points to be insulated inexcessible to such coating operations but it was extremely hard to produce a coating having minimum weight which was sufficiently uniform in thickness to insure adequate insulation to the vital surfaces involved. Furthermore, the liquid vehicle or carrier of the insulative material was flammable thus presenting a constant safety hazard in addition to impairing the final properties of the insulating layer.

As mentioned hereinabove, the epoxy material required a long curing cycle. Since many areas of a launch vehicle can be coated with an insulative material only after the vehicle is assembled, and since these areas are generally quite large, the necessity of a long curing cycle plus high temperatures made the insulating of these areas unduly difficult and expensive. This is particularly true in those cases where the elevated curing temperatures are obtainable only through the use of a curing oven or like arrangement. Furthermore, this long curing cycle at elevated temperatures precluded the use of many so called exotic materials as structural members in the launch vehicle, which would otherwise have been employed due to their superior weight-strength characteristics, since these materials have maximum upper temperature limitations of around 100° C., (300° F.) and thus would not withstand the curing or operating temperatures to be encountered.

It, therefore, became obvious early in the development of large launch vehicles and missiles that a more suitable insulating material was necessary if a superior craft was to be produced at a reasonable cost. This new insulating material must not only be flame-resistant and have high insulating properties when exposed to radiation type heating, but should be readily appliable in thick layers by a trowelling or rolling action and cure speedily at relatively low temperatures.

According to the present invention, it has been found that a flame-resistant insulating material which overcomes the above enumerated disadvantages associated with prior known insulating materials can be produced from readily available materials at a relatively low cost. Thus, in its broadest aspects, this invention contemplates production on an inexpensive, easily usable, flame-resistant, insulative ceramic composition comprising a bonding agent having a low curing temperature such as colloidal silica to which an opacifier type filler, preferably of potassium titanate, and a shrinkage reducing additive from the asbestos or glass fiber class has been added. To improve the insulating properties as well as the handling charactertistic of the cured composition, the coating is covered by a protective layer or film of material and the improved insulation resulting therefrom is also contemplated by this invention. This invention further contemplates materials and structures which have been rendered flame-resistant and/or insulated by the use of the present composition.

Therefore, the primary object of this invention is to provide a flame-resistant agent useful in insulating various articles to render the same immune from the adverse effect produced by external heating.

Another object of this invention is to provide a ceramic flame-resistant insulating agent which can be applied in relatively thick layers by trowelling or rolling and will cure at relatively low temperatures into a solid, low density coating.

Yet another object of this invention is to provide a ceramic flame-resistant insulating composition that cures into a solid low density coating having a hard dense outward protective layer and a density gradient through the thickness thereof that is less at the center than at the surfaces.

Yet still another object of this invention is to provide a flame-proof heat resistant coating having a low density that will absorb and withstand extreme amounts of moisture, vibration and thermal shock without being adversely effected.

A further object of this invention is to provide a flame-proof, heat resistant coating having high refractoriness, reflectance, and emissivity properties with correspondingly low thermal conductivity.

These and further objects and advantages of this invention will become more apparent upon reference to the following specification, appended claims and drawings herein:

FIGURE 1 graphically illustrates the effect of composition on the temperature rise of the potassium titanate ceramic insulative coating;

FIGURE 4 illustrates graphically the density gradient through the potassium titanate insulative coating;

Figure 7:
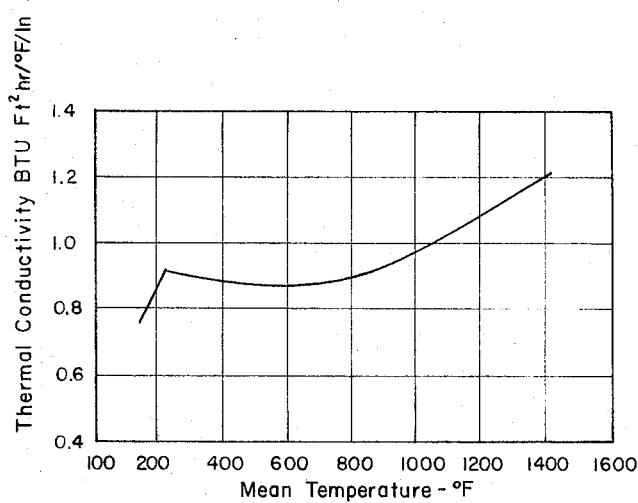

FIGURE 5 graphically depicts the absolute spectral reflectance of the insulative coating;

FIGURE 6 graphically depicts the emissivity of the insulative coating;

FIGURE 7 shows the thermal conductivity of the insulative coating; and

Figure 8:
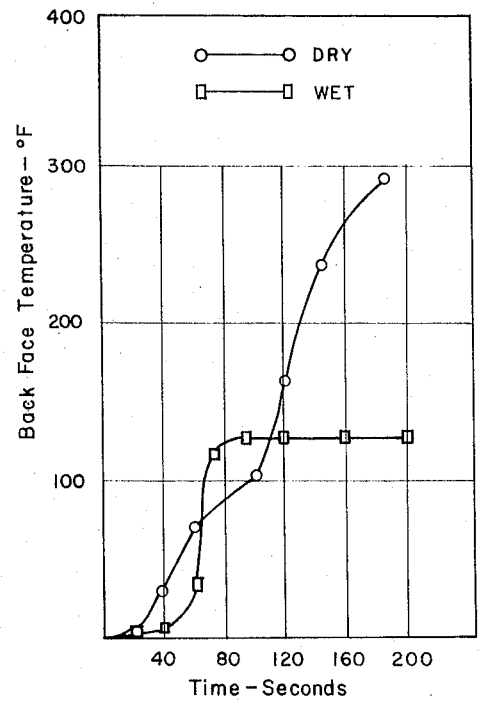

FIGURE 8 illustrates graphically the effect of moisture upon the temperature rise of the insulative coating.

Since extensive tests on the heating of rocket powered launch vehicles have revealed that substantially all of the thermal loading on the base of the vehicle during its launch is due to radiant heating, it was proposed that the vehicle be insulated from infrared radiation by diffuse reflectance. Numerous different types and combinations of heretofore known materials which allegedly possessed such properties were tested but none were found which would meet the rather rigorous requirements necessary for acceptability in space orientated operations. For example, various types of pigments which appeared to have the required properties were tested as an insulative material but, due to the inherent characteristic of insulations using such pigments, it was found difficult and often impossible to prepare the thick coatings that are necessary for the protection of space vehicles. Furthermore, these coatings were excessively brittle and tended to flake or, otherwise fall away from metal plates of the vehicle during use.

Therefore, since no insulation could be found which met the requirements dictated by the space environment in which it was to be used, a broad research and development program was undertaken to discover and perfect an insulating material for use on space vehicles. This program resulted in various types of fibrous materials being investigated for use as the opacifier in the insulating material. After considerable investigation involving many different materials, it was discovered that fibrous potassium titanate is the most nearly perfect opacifier and it was, therefore, selected for use in the present invention.

As a result of these tests, it was also discovered that not only must the insulating material be prepared from a non-flammable material that contained particles having a high refractive index, but that the size of these particles must adhere to discrete dimensional limitations. This is true since the wave length of radiation that is blocked or scattered by diffuse reflectance is dependent upon the diameter or cross-sectional area of the particles used to make up the thermal insulation, i.e., composites made from particles of a specific range of diameters will be most effective against radiation of a particular range of wave lengths. Also, the amount of drying shrinkage of the composite material is indirectly proportional to both the diameter and length of the fibers used to make up the insulation. In the present instance it has been found that the optimum diameter for the fibrous potassium titanate was in the range of from 1 to 2 microns.

Potassium titanate fibers generally are produced in the form of loose, irregular masses or lumps, but the individual fibers can be exfoliated from the lumps by simply using a stirrer that gives high liquid shear. When desirable, the fibers can be dispersed in water thus giving a pulp like mixture which can be handled in much the same manner as paper pulp to form blocks by filtering on a screen using pressure or vacuum filtration. This compressed block form of potassium titanate should preferably have a bulk density of from 17 to 19 pounds per cubic foot.

The particular form or type of potassium titanate best suited for use as a reflector of radiant energy in the insulating material was determined by evaluating coatings that contained the block and/or loose fiber form either alone or in various combinations. An inorganic sol, which served as a binder, was mixed together with the various forms of potassium titanate fibers until the desired consistency was obtained. The potassium titanate mixture was then applied by trowelling to an expanded metal overlay held on a steel blank by spot welded joints. To expedite the curing cycle, the coated specimens were dried by exposing the uncoated side of the blank to a bank of radiant heat lamps. After curing, a thermocouple was attached to the back face of each steel blank and a heat flux of $24 \pm 1.2$ B.t.u./ft.$^2$ sec. was applied to the face of the coated test specimen and the rise in temperature, as indicated by the thermocouple, recorded.

Figure 1:
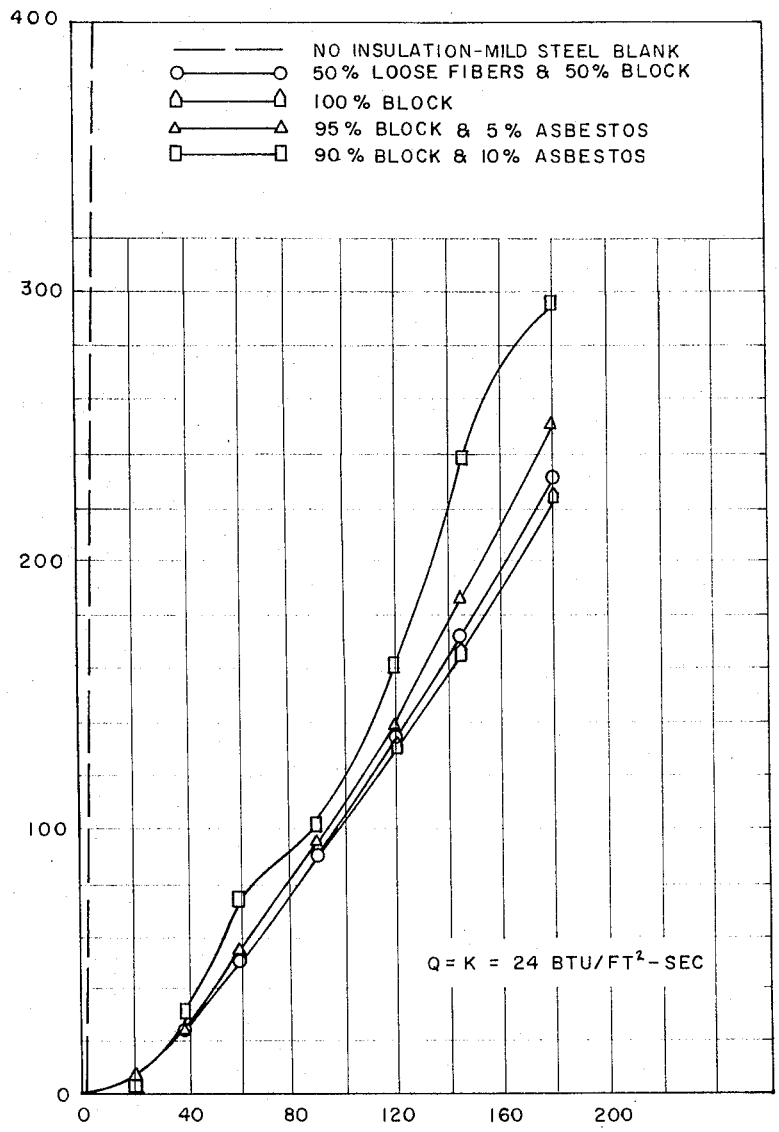

As shown in FIGURE 1, the form of potassium titanate used as the reflector in the test specimens did not appreciably affect the thermal insulating capabilities of the coating. However, specimens prepared using the block form only of potassium titanate displayed considerably less shrinkage and therefore fewer and smaller cracks than the specimens prepared from the loose fiber form. Additional improvement in the shrinkage resistance of the block form potassium titanate was obtained by adding ten percent by weight of a high-silica fiber obtained under the trade name "Refrasil" from H. I. Thompson Fiberglass Company of 1723 Cordova Street, Los Angeles 7, California. Therefore, since the fibrous and block forms of potassium titanate possesses substantially the same insulating properties, and since the block form exhibits superior shrinkage resistance, the block form of potassium titanate was chosen as the opacifier and filler for the insulating material.

It was observed during these tests that the effectiveness of the potassium titanate as an opacifier was greatly dependent upon its reflectivity which varied somewhat between samples. As investigation of this phenomenon revealed that the reflectivity of potassium titanate is effected adversely by the presence of any contaminating material. Therefore, to obtain ultimate insulating properties from the potassium titanate, and to improve the uniformity of the insulating material, it was found that the potassium titanate must be heat treated at approximately 538° C. for about four hours. This treatment resulted in substantially all of the organic contaminates present within the potassium titanate being removed which, in turn, improved the uniformity and reflectivity of the insulating material.

Various low temperature curing inorganic binders were then produced and tested in an effort to determine which one would give ultimate performance under the severe thermal and vibrational shock to be encountered in actual use. Among those inorganic binders tested was sodium silicate, monoaluminum phosphate, colloidal alumina and colloidal silica. Each binder under test was used to prepare a set of specimens in substantially the manner set forth hereinabove using heat treated block potassium titanate with 10 percent "Refrasil" added thereto as a filler. All specimens were then dried at 93° C. in an electrical oven and, after drying, were checked individually for moisture resistance by immersing them three hours in boiling tap water having a pH of 7.3. This test revealed that the only specimens that did not disintegrate were those bonded with colloidal silica. The sodium silicates were unacceptable as a binder since they lack refractoriness and had to be cured at undesirably high temperature. Although the monoaluminum phosphate was an excellent bonding agent, it too was unacceptable as a binder since it attacked the steel structure to which it was applied in a rather vigorous manner. Colloidal alumina, on the other hand, failed to have sufficient strength to support the weight of the insulating coating.

Therefore, since colloidal silica provided a satisfactory bond for the potassium titanate coating when cured at a temperature as low as 82° C., it was selected as the binder for the coating. Also, and more importantly, the coating prepared with colloidal silica as a binder had a hard, dense outer film or layer formed thereon by the silica colloids that had migrated toward the surface during the drying process. This outer layer not only served to protect the coating to a limited degree from moisture but also added additional strength and rigidity thereto. A colloidal silica sol containing 30 percent by weight of solids of silicon dioxide dispersed in water was found to give optimum results as a binder.

For actual environmental testing, a coating of insulating material composed of potassium titanate bonded together with a colloidal silica sol containing 30 percent solids was applied to a thickness of 0.280 inch over the face of a steel heat shield plate for a Saturn type launch vehicle. The face of the panel included an overlay of expanded metal attached by spot-welding on approximately 6 inch centers. Upon static firing of the launch vehicle, the coating failed by separating from the expanded metal because it did not possess sufficient strength to withstand the vibration and flexure encountered.

A failure of this nature had not been anticipated since test specimens of the coating had been subjected to extensive vibration tests in the laboratory prior to its being used on a launch vehicle. Therefore, a program was initiated to develop an insulating coating having the high insulating properties of potassium titanate-silica sol material but possessing greater strength.

Although no additive was found which could be incorporated into the coating material for increasing its strength without decreasing its radiant heat resistant properties, asbestos and refractory glass fibers were found to produce the least adverse effects upon the material. It was also found that both asbestos and refractory glass fibers were extremely effective in decreasing the shrinkage of the coating material and, thus, reducing the number and size of fractures appearing in the material. However, the refractory glass fibers increase the density of the finished material above that which was desirable. Therefore, a long fiber asbestos was determined to be the most suitable strengthening and shrinkage preventing additive that could be incorporated into the insulating material to be used on a launch vehicle. Accordingly, specimens containing 0, 5, and 10 percent asbestos fibers were prepared for testing and applied to an expanded metal spot-welded to a steel blank.

FIGURE 1 graphically illustrates how the addition of asbestos fibers decrease to some extent the effectiveness of the potassium titanate as a radiant heat reflector. However, FIGURE 1 also clearly illustrates the extreme effectiveness of the potassium titanate and asbestos insulator as a radiant heat reflector since the temperature rise for the first 8 seconds of test for the insulated test specimens was about 0.6° C. compared to about 222° C. for the unprotected mild steel blank.

After the thermal tests were completed, a program of vibration and flexure was initiated in which all specimens were tested to destruction with increasing "$g$" loads. Specimens that did not contain asbestos fibers sometimes failed under the weight of the coating itself while specimens containing either 5 or 10 percent asbestos always failed at the spot-weld attaching the expanded metal to the sheet blanks. Failure of specimens containing 10 percent asbestos generally occurred at 35 to 50 $g$ (⅛ to ¼ inch deflection with an 11-inch long test specimen). This is approximately 25 percent higher than the $g$ load required to cause failure of specimens containing only 5 percent asbestos. One specimen containing 10 percent asbestos withstood 72 $g$ for 15 seconds after four minutes at an average of 40 $g$ vibration. All specimens tested after soaking in water for 170 hours generally failed at approximately 40 $g$. However, one specimen withstood almost 90 $g$ for 7 seconds after 2 minutes at 40 $g$. Generally the deflection of the wet specimens was greater than that of the dry specimens at the same frequency because of their greater weight. Failure was still in the spot-welds, however, and not in the material.

To increase the shrinkage-preventing properties as well as to improve the strength of the coating material, the fibrous asbestos additive should be carded and of number one chrysolite AAAA grade having a maximum iron content of no more than 1.3 percent by weight in the form of ferrous oxide (FeO). Such fibrous asbestos can be obtained from Asbestos Corporation of America, 31 North Avenue, Garwood, New Jersey. To insure that the asbestos fibers would not impair the application of the insulative coating material to various shapes and sizes of articles, the fibers should be cut to a length of from three-eighths to one-half inch prior to being added to the coating material.

The production of the highly reflective unfired ceramic insulative coating according to the invention will now be described with reference to a working example. This example, although disclosing the preferred embodiment of the invention, is offered in order to illustrate the invention and is not intended to set forth the limitations thereof.

In order to prepare the highly reflective unfired ceramic insulative coating for use on a rocket launch vehicle, the following procedure is used:

270 grams of block potassium titanate containing 10 percent by weight of a high-silica fiber and having a density of 17 to 19 pounds per cubic foot in addition to the properties set out in Table I hereinbelow is heat treated in an oven at 538° C. for at least 4 hours to remove any organic contaminates that may be found therein.

TABLE I

*Fiber properties of fibrous potassium titanate*

| | |
|---|---|
| Average diameter _____ microns__ | 1 |
| Length after dispersion _____ mm__ | 0.2 to 0.5 |
| Melting point _____ ° F__ | 2500 |
| Density _____ g./cc__ | 3.6 |
| Specific heat _____ B.t.u./° F./lb__ | 0.22 |
| Hardness, Mohs _____ | 4.0 |
| Chemical composition, approximate _____ | $K_2Ti_6O_{13}$ |

After the baking out of the organic contaminates is complete, the block potassium titanate is removed from the oven and placed in a mixing bowl. 30 grams of long fiber asbestos, which has been carded and cut into lengths of approximately one-half inch in length, is then added to the mixing bowl and blended together with the potassium titanate for approximately 4 minutes using a double cone type mixer until a uniform mixture is obtained. 1,260 grams (1050 milliliters) of colloidal silica sol consisting of 30 percent by weight solids of silica dioxide dispersed in water is now added to the mixture in small amounts with the mixer running at a relatively slow speed thus giving a final composition having a trowellable consistency.

The insulating composition formed in the above described manner is listed in Table II and, although preferred, it is to be realized that compositions containing from 1–20 percent (by weight) asbestos fibers; 20–60 percent (by weight) of block potassium titanate, and 30–60 percent (by weight) of silica colloids obtained from a colloidal silica sol can be used even though the insulating qualities of the composition will be somewhat inferior to that of the preferred embodiment.

TABLE II

*Batch composition of thermal insulation material*

| | Parts by weight |
|---|---|
| Block potassium titanate with 10% high-silica fibers | 90 |
| Silica sol | 420 |
| Cut asbestos | 10 |

The resultant mixture of the insulating material is in the undried condition and has a working time of approximately 30 minutes at room temperature. Therefore, any portion of the mixture that cannot be used within 30 minutes after being mixed should be stored in an air-tight container at room temperature. The mixture may be stored in this manner for approximately one week.

Figure 2:
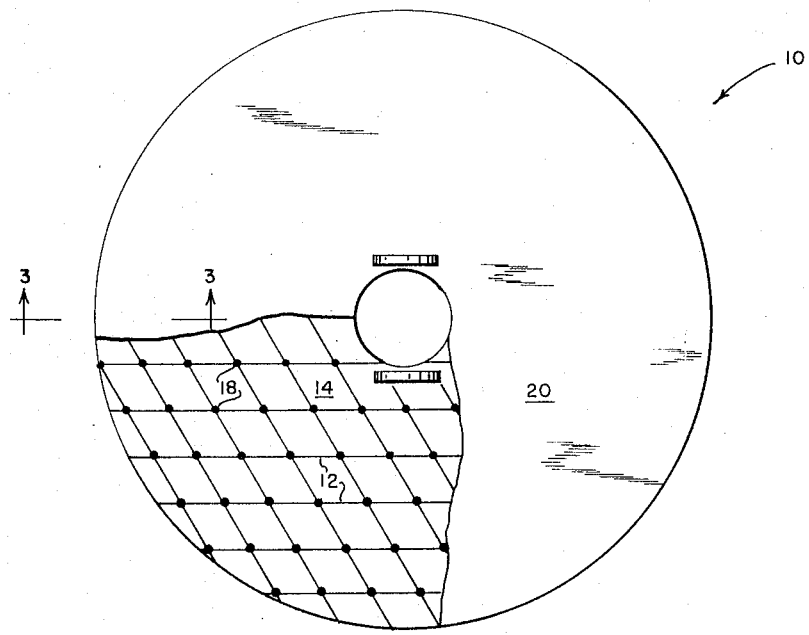
FIGURE 2 is a top view of a heat shield for a rocket vehicle which is partially coated with the potassium titanate insulative coating.
Figure 3:
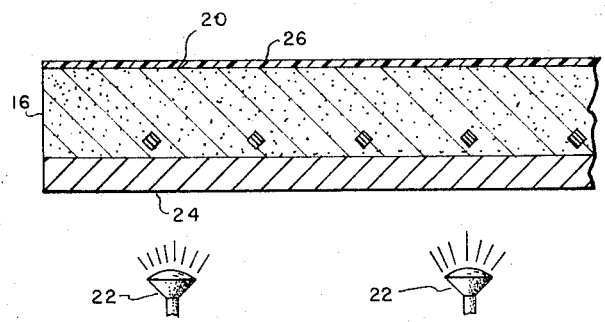
FIGURE 3 is a cross sectional view of FIGURE 2 taken along line 3—3.

In order to better illustrate the application of an insulative coating produced in accordance with this invention, reference is made to FIGURES 2 and 3 which show the coating applied to the base plate 10 of a rocket vehicle. To apply the insulation to the metal air frame of the rocket vehicle, it is necessary to use some type of mechanical device for bonding purposes. It has been found that a metal mesh reinforcement not only improves the structural stability of the insulating layer but provides an excellent mechanical interlock because its sides are not vertical but are set at an angle. Such an expanded metal mechanical device 12 was fabricated from 26-gauge SAE 1015 steel having diamond shaped openings 14 approximately one-half inch across the longest dimension and one-fourth inch across the shortest. The overall thickness of the steel material was approximately 0.080 inch and it weighed 0.27 pound per square foot. The expanded metal is attached to its steel substrate or base plate 16 by spot-welds 18. To assure the best possible spot-welds, both the expanded metal and its steel substructure were cleaned with an organic solvent before the spot-welding operation. The insulating material 20 is now applied to the base plate 16 by trowelling and rolling. Care should be taken in this operation to insure that a coating of uniform thickness is applied and that it is interlocked in the expanded metal overlay 12.

The thermal insulation 20 is now cured by simply removing the water in the silica sol. This can best be accomplished by uniformly heating the coated panel or by allowing the panel to dry at room temperature. In the present instance, a bank of infrared heat lamps 22 are used for drying the insulation by first raising the surface temperature of the uncoated side 24 of the base plate 16 from ambient to 49° C. in one hour and held at this temperature for four hours. The surface temperature is then raised from 49° C. to 82° C. over a period of ten hours and held at this temperature for two hours. All temperatures are controlled within plus or minus 6° C.

Any drying cracks that may form can be filled easily with a grout composed from one part, by weight, of heat treated loose fibers of fibrous potassium titanate and 6 parts, by weight, of colloidal silica.

Because the effectiveness of the insulating material depends to a great extent upon its optical properties, a protective coating 26 was required to keep the outer surface of the material from being contaminated during assembly and other handling operations. Two types of protective coatings were given consideration. The first type consisted of a plastic strippable coating, applied over the insulating material, which could be removed prior to flight while the second type was one that could be readily consumed by the heat absorbed from the engine exhaust gases without leaving any residue that would offset the optical properties of the surface of the material. Since it is generally not desirable to use a coating that had to be stripped prior to flight, the second type of coating was given primary emphasis.

Both the nitrocellulose and strippable coating started flaming at about 5 seconds after exposure and burned for approximately 2 seconds. At this point, the coatings charred leaving a carbon residue on the surface of the insulation. At about 18 sec. after exposure, the carbon residue of the samples coated with nitrocellulose was completely burned off. It took approximately 30 seconds to burn off the carbon residue left by the strippable coating. Because the carbon causes the specimen to absorb heat, the temperature rise was higher for those specimens on which the carbon remained the longest. Therefore, selected oxidizers such as potassium bromate or ammonium nitrate were added to the nitrocellulose protective coating to further decrease the burn-off time of the material. It was discovered that nitrocellulose containing 11.8–12.2 percent nitrogen and the added oxidizer produced an excellent coating that would burn off quickly.

The nitrocellulose was reduced to a liquid form for application to the insulating material by dissolving it in sufficient methylethyl-ketone to give a Zahn number 3 viscosity of 22 plus or minus 2 seconds. The solution was then colored with a dye consisting of a saturated solution of Diazine Green in ethyl alcohol. The purpose of the coloring agent was to increase the heat absorptivity of the protective coating, thus accelerating burn off. The nitrocellulose coating was then applied by brushing to the surface of the insulating material thus forming of coating approximately 1.5 mils in thickness when dried. In those cases where a light sensitive coating material is used, a light absorbing additive should be included to reduce the aging of the coating and its tendency to crack or peel.

As mentioned hereinabove, silica colloidals migrate toward the surface of the insulating material during the drying process which produces a density gradation through the thickness of the coating. To illustrate this density gradation, the densities of selected layers of a specimen approximately ¼ inch thick was determined as follows:

The average density of the ¼ inch thick specimen was first determined. Secondly, a thin layer of the outer surface of the specimen was removed by grinding, since the material has a hardness of H98 as determined by a model 4JR Rockwell Superficial Hardness Testor, and the density of the removed material calculated. This latter step was repeated several times until only a thin layer of the specimen remained. The results obtained from this evaluation are illustrated in FIGURE 4.

FIGURE 4 clearly shows that the density of the specimen is higher at the front face dropping to a lower density near the middle portion, and sharply rising to an intermediate near the back face. This would indicate that either some of the silica colloids are not migrating toward the front face during drying, but remain in situ near the back face of the specimen, or the migration from the middle portion occurs in both directions. As mentioned earlier, this high density on the outer surface is extremely important since it is sufficiently hard to resist ablation produced by high velocity exhaust gases thus increasing the usefulness of the insulating material. This outer surface was determined to have a Mohs hardness of about 6.

The moisture effect of the dried or cured insulation was determined by a boiling-water test. In conducting this test the thickness of four specimens of the coating were measured to the nearest 0.0001 inch in selected spots after which they were submerged for three hours in boiling tap water having a pH of 7.3. Care was exercised to insure that the specimens did not come in contact with the bottom of the water container. After boiling the specimens were dried in an electrical drying oven. The thicknesses were measured again at the same spots as before. The average thickness loss was determined to be less than 0.12 percent thus indicating that water does not appreciably effect the stability of the material.

An indication of the refractoriness of the insulation material was obtained by forming the material into bar specimens and heating these bars, which were supported at only one end, in an electrical furnace. The furnace temperature was raised at approximately 110° C. per hour with no change being noted in the position of the bars up to 871° C. At this temperature the bars had softened sufficiently to cause them to bend slightly. From this point on the bars were removed from the furnace after each 56° C. temperature rise and examined visually. No other change in the refractoriness of the coating was noted until the temperature reached 1204° C. At this temperature it was noted that some melting of the inner part of the coating had occurred. There was no melting of the outer layer of the material up to a temperature of 1316° C.

The thermal-shock resistance of the insulation, both with and without an expanded metal reinforcement overlay being employed, was determined by placing the specimens in a hot furnace until they reach the furnace temperature after which they were removed and quenched in water. This procedure was repeated, using three fresh samples for each test step, in approximately 100° C. steps beginning at 427° C. and continuing through 982° C. All specimens withstood the cold shock when quenched from 871° C. and below, but failed at temperatures above 982° C. At this high temperature, the reinforced specimen did not, however, separate or pull away from the expanded metal reinforcement.

A Perkin-Elmer model 112 Pass, single beam spectrophotometer equipped with a special integrating sphere was used to measure the absolute spectral reflectance in the 0.30–3.0 micron wave length range. The results obtained by the measurements are shown graphically in FIGURE 5. The special emissivity values of the material in the wave length region between 3 and 14 microns is shown in FIGURE 6.

The thermal conductivity of the insulating material is illustrated in FIGURE 7. To determine the effect of water on the thermal performance of the insulating material, specimens were prepared by applying the insulating material to expanded metal overlays spot-welded to blanks of mild steel that were 0.038 inch thick, 6 inches wide, and 11 inches long. Some of the specimens were soaked in water for 170 hours which increased their weight approximately 75 percent. Both the wet and dry samples were exposed to radiant heating. The results obtained are given in FIGURE 8 which shows that after 40 seconds of exposure the temperature of the specimens containing water rose rapidly until it reached 100° C., the boiling temperature of water. At this point the temperature remained constant for the duration of the test, thus indicating that all the water had not been removed. The rapid temperature change of the specimens containing water is attributed to the high conductivity of water. After 145 seconds of exposure the temperature rise of the wet insulating material was only about 55 percent of that of the dry. This indicates that water actually enhances the effectiveness of the insulation at one atmosphere pressure when exposed to a radiant heat flux of 24 B.t.u./ft.²-second.

It was found that the insulating material in the wet condition is approximately 22 percent weaker than the dry material in its original condition. However, moisture seems to have little or no effect on the strength of the material provided the material is thoroughly dried before being subjected to a stress.

From the foregoing it is readily apparent that a new type of ceramic insulative material which can be readily applied as a coating to various surfaces such as, for example, the base plate of a rocket launch vehicle has been developed. This insulating material consisting of fibrous potassium titanate block containing high-silica fibers and colloidal silica sol, to which asbestos fibers have been added for greater strength and shrink resistance, is unique in that it does not require a high curing temperature but dries at 82° C. to form a stable low density insulative material (46–50 pounds/cubic foot) having a hard, dense outer protective layer and a relatively light inner portion. This insulative coating can withstand extremely high frequency vibration having intensities in excess of 70 g's without deteriorating, and the addition of moisture to the coating enhances its effectiveness as an insulator without appreciably increasing its susceptibility to shock. The absolute spectral reflectance of the material lies between 80–90 percent in the 0.40–1.90 micron wave length range, and its spectral emissivity is between 0.60–0.66 at 321° K. (578° R.) in the 5–13 micron wave length range. The addition of a coating to the insulating material, which can readily be removed, for protecting the optical properties of the material greatly reduces or eliminates the handling problems normally associated with insulative coatings using the principle of diffused reflectance for blocking infrared radiation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the means and range of equivalency of the claims are therefore intended to be embraced therein.

What is claimed and desired to be secured by United States Letters Patent is:

1. An unfired-ceramic flame-resistant composition capable of being applied to the surface of an article and of forming thereon a hard permanent coating which is stable at temperatures incident to its normal use and further characterized by its ability to reflect substantially all of the heat impending on the surface thereof, said composition being in the form of a mixture consisting essentially of potassium titanate to which has been added a bonding agent of inorganic sol and a shrinkage reducing additive selected from the group consisting of asbestos fibers, glass fibers, and mixtures thereof.

2. An unfired-ceramic flame-resistant composition capable of being applied to the surface of an article and of forming thereon a hard permanent coating which is stable at temperatures incident to its normal use and further characterized by reflecting substantially all of the heat striking the surface thereof from an external source, said composition being in the form of a mixture consisting of fibrous potassium titanate to which has been added an asbestos shrinkage reducing additive and a bonding agent consisting of a colloidal silica sol.

3. An unfired-ceramic flame-resistant composition capable of being applied to the surface of an article and of forming thereon a hard permanent insulative coating which is stable at temperatures incident to its normal use and further characterized by reflecting substantially all of the heat striking the surface thereof, said composition being in the form of an intimate mixture consisting of block type fibrous potassium titanate having a density of from 17 to 19 pounds per cubic foot to which has been added a long fiber asbestos shrinkage reducing additive and a bonding agent consisting of a fluid mixture of aqueous colloidal silica sol.

4. An unfired-ceramic flame-resistant composition according to claim 3 wherein the individual strands of said block type fibrous potassium titanate have an average diameter of between 1 and 2 microns.

5. An unfired-ceramic flame-resistant composition according to claim 4 wherein a high-silica shrinkage reducing fiber is intermixed with said block type potassium titanate.

6. An unfired-ceramic flame-resistant composition according to claim 5 wherein said long fiber asbestos is carded and cut into lengths of approximately one-half inch prior to being added to said composition.

7. An unfired-ceramic flame-resistant composition according to claim 6 wherein said bonding agent consists of a mixture of 30 percent by weight of solids of silicon dioxide dispersed in water.

8. An unfired-ceramic flame-resistant composition capable of being applied to the surface of an article and of forming thereon a hard permanent coating which is stable at temperatures incident to its normal use and further characterized by its ability to reflect substantially all of the heat striking the surface thereof, said composition comprising from 20 to 60 percent by weight by block potassium titanate to which has been added from 1 to 20 percent by weight of a fiber asbestos shrinkage reducing additive and from 30 to 60 percent by weight of silica obtained from a colloidal silica sol.

9. An unfired-ceramic flame-resistant composition capable of being applied to the surface of an article and of forming thereon a hard permanent coating having a variance in gradient therethrough and further characterized by its ability to reflect substantially all of the heat striking the surface thereof, said composition consisting of 90 parts by weight of a mixture of block potassium titanate and 10 percent by weight of high-silica fibers to which has been added 10 parts by weight of a fiber asbestos shrinkage reducing additive and 420 parts by weight of an aqueous colloidal silica sol bonding agent.

10. An article of manufacture comprising a base structure having thereon a coating of an unfired-ceramic flame-resistant composition which is stable at temperatures to which the article is normally subjected and which is further characterized by its ability to reflect substantially all of the heat striking the surface thereof, said composition being in the form of an intimate mixture consisting essentially of potassium titanate to which has been added an inorganic sol bonding agent and a shrinkage reducing additive selected from the group including asbestos fibers, glass fibers, and mixtures thereof.

11. An article of manufacture comprising a base structure having thereon an insulative coating of an unfired-ceramic flame-resistant composition which is stable at temperatures to which the article is normally subjected and which is further characterized by its ability to reflect substantially all of the heat striking the surface thereof, said composition being in the form of an intimate mixture consisting of block type fibrous potassium titanate to which has been added a fiber asbestos shrinkage reducing additive and an aqueous colloidal silica sol bonding agent.

12. An article of manufacture comprising a base structure having thereon an insulative coating of an unfired-ceramic flame-resistant composition which is stable at temperatures to which the article is normally subjected and which is further characterized by its high absolute spectral reflectance in the 0.40–1.90 micron wave length range, said composition being in the form of an intimate mixture consisting of from 20 to 60 percent by weight of block potassium titanate having an average diameter of between 1 and 2 microns to which has been added from 1 to 20 percent by weight of a fiber asbestos shrinkage reducing additive and from 30 to 60 percent by weight of silica obtained from a colloidal silica sol.

13. In combination, a base plate, means formed on at least one surface of said base plate for receiving and holding an insulative coating, and an insulative coating applied over said holding means for protecting said base plate from an external source of radiant energy, said insulative coating consisting of 90 parts by weight of a mixture of block potassium titanate and 10 percent by weight of high-silica fibers to which has been added 10 parts by weight of a fiber asbestos shrinkage reducing additive and 420 parts by weight of an aqueous colloidal silica sol bonding agent.

14. In combination, a base plate for a rocket launch vehicle having secured to one surface thereof an expanded metal overlay, an insulative coating applied over said metal overlay for protecting said surface from an external source of radiant energy, said insulative coating consisting of 90 parts by weight of a mixture of block potassium titanate and 10 percent by weight of high-silica fibers to which has been added 10 parts by weight of a fiber asbestos shrinkage reducing additive and 420 parts by weight of an aqueous colloidal silica sol bonding agent, and a removable protective coating applied over said insulative coating for protecting the optical properties of said insulative coating until said insulative coating is placed into use.

15. The combination of claim 14 wherein said removable protective coating is a nitrocellulose material adapted to be removed from said base plate by burning when said plate is exposed to an external source of radiant energy.

16. The combination of claim 15 wherein an oxidizer is added to said nitrocellulose material to increase the speed with which said coating is burned from said base plate when said plate is exposed to an external source of radiant energy.

17. The combination of claim 16 wherein a coloring agent is added to said nitrocellulose material for increasing the heat absorptivity of said material thereby increasing the rate at which said material burns when exposed to an external source of radiant energy.

18. The combination of claim 14 wherein said insulative coating is saturated with a non-inflammable liquid having a low boiling point for enhancing the insulating properties of said coating.

19. The method of insulating an article which comprises, mixing an aqueous colloidal silica sol bonding agent with a reflectance filler comprising fibrous potassium titanate and asbestos, coating the resultant mix over said article, and drying the coating for removing the free water present in said bonding agent thereby producing a silica gel which binds the particles of said result mix into a unitary coated surface.

20. The method of insulating the base plate of a rocket launch vehicle which comprises, securing an expanded metal overlay to the outer surface of said base plate for receiving and holding an insulative coating, applying an insulative coating to said metal overlay thereby covering said surface of said base plate, said insulative coating comprising a mix of 90 parts by weight of block fibrous potassium titanate containing 10 percent by weight of high-silica fibers to which has been added 10 parts by weight of a fibrous asbestos shrinkage reducing additive and 420 parts by weight of an aqueous colloidal silica sol bonding agent, drying said insulative coating thereby removing the free water in said bonding agent so that said silica adheres to said fibrous materials and binds said materials into a solid stable insulative coating, and coating the outer surface of said insulative coating with an inflammable material of the type that will burn away when said outer surface is exposed to a source of radiant energy, said coating being adapted to protect the optical properties of said insulative coating during handling.

21. The method of producing an insulative coating which comprises, placing 90 parts by weight of organically clean block fibrous potassium titanate having a density of between 17 and 19 pounds per cubic foot and containing 10 percent by weight of a high-silica fiber into a mixing bowl, adding to said mixing bowl 10 parts by weight of a fibrous asbestos which has been cut into lengths of approximately one-half inch, blending the materials in said mixing bowl into a uniform mixture, adding to said mixture 420 parts by weight of colloidal silica sol bonding agent consisting of 30 percent by weight solids of silica dioxide dispersed in water, blending the materials in said mixing bowl until said materials have a uniform consistency, removing said materials from said mixing bowl and applying said materials to an article to be insulated, and drying said materials so that the free water in said bonding agent is removed thereby producing a silica gel which adheres to said fibrous material and binds said materials into an unfired-ceramic flame-resistant insulative coating.

22. The method of claim 21 wherein said unfired-ceramic flame-resistant insulative coating is soaked in water to saturate said coating thereby improving its insulative properties against temperatures above the boiling point of water.

References Cited by the Examiner

UNITED STATES PATENTS

| | | | |
|---|---|---|---|
| 2,893,888 | 7/1959 | Yarotsky | 117—6 |
| 3,014,872 | 12/1961 | Scott | 162—152 |
| 3,017,318 | 1/1962 | Labino et al. | 161—170 |
| 3,057,744 | 10/1962 | Barbaras | 117—169 |

OTHER REFERENCES

Aviation Week of July 18, 1960, pp. 54–55, 57, 59 and 61.

Astronautics of April 1961, pp. 27–29 and 58.

ALEXANDER WYMAN, *Primary Examiner.*

JACOB H. STEINBERG, R. A. FLORES,
*Assistant Examiners.*